Patented Oct. 13, 1936

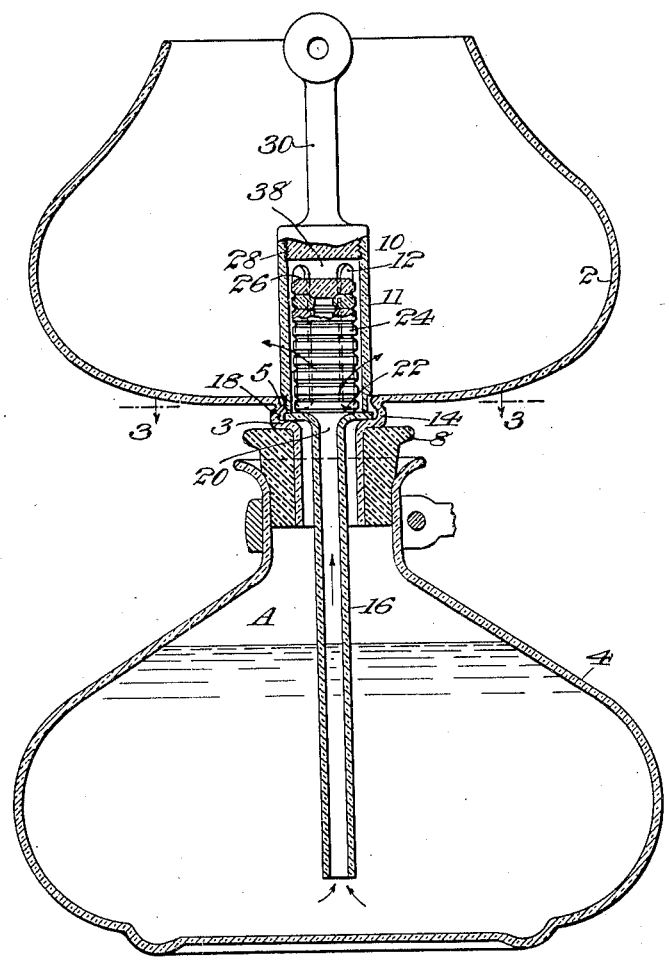
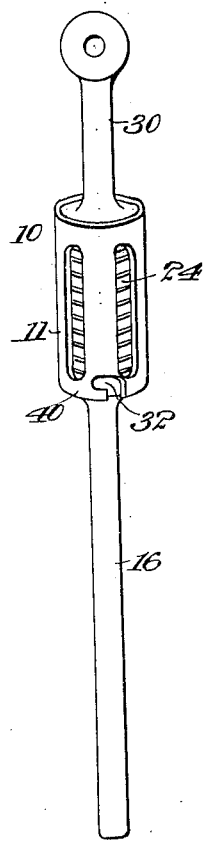
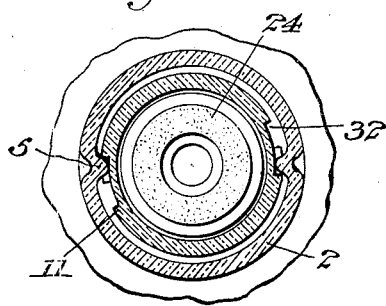

2,057,616

UNITED STATES PATENT OFFICE 2,057,616

APPARATUS FOR MAKING INFUSIONS OF COFFEE OR THE LIKE

Clyde D. Keaton, Long Island City, N. Y., assignor, by direct and mesne assignments, of two-thirds to Stanley S. Tumbridge, New York, N. Y.

Original application November 7, 1933, Serial No. 696,954. Divided and this application October 8, 1935, Serial No. 44,004

2 Claims. (Cl. 53—3)

The present invention relates to an apparatus for making infusions of coffee or the like.

In coffee makers of the type wherein there is provided a lower container and an upper container with an interconnecting passage between the containers generally formed by a tubular extension of the upper container, it has been customary to place a filtering device at the upper end of the passage which, if made of cloth, permitted the entire passage to remain open or if made of imperforate glass formed an orifice determined by the opening between the irregular peripheries of glass filter and wall of the container. In either instance there is a single orifice, the size of which cannot be varied to change the rate of flow between the two containers and a filter made for one size of coffee maker cannot be utilized in another.

It is essential, in order to obtain the best brew to prevent the flow of water from the lower container to the upper until a predetermined temperature has been reached, which in the present coffee makers cannot be done.

An object of the present invention is the provision of means whereby the rate of flow from one container to the other may be varied. Another object is to prevent flow of the liquid until a predetermined temperature has been reached. Another object is the provision of a plurality of small orifices between the containers instead of a single large one.

These and other objects will be readily understood with reference to the accompanying drawings in which:

Fig. 1 is a sectional view of one embodiment of the invention;

Fig. 2 is a perspective view of the filter of Fig. 1;

Fig. 3 is a sectional view on the line 3—3 of Fig. 1;

Figure 4:
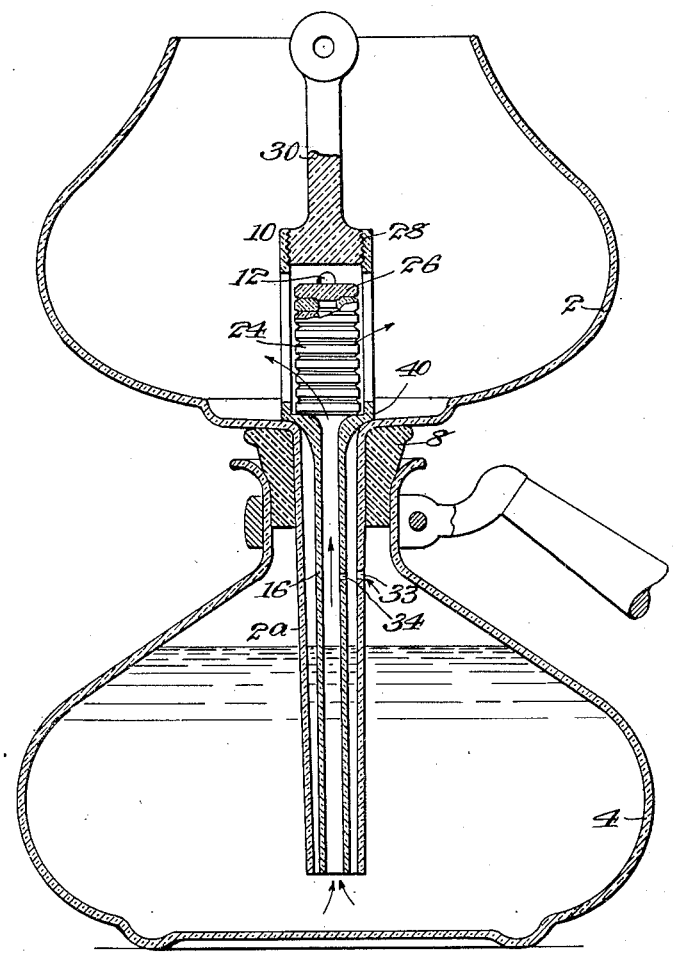
Fig. 4 is a view of another embodiment of the invention.
Figure 5:
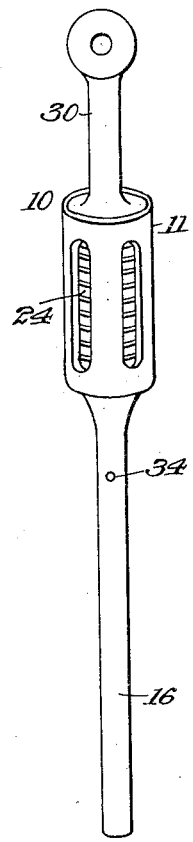
Fig. 5 is a perspective view of the filter of Fig. 4.
Figure 6:
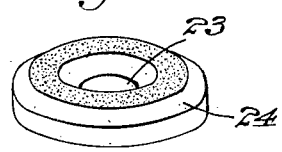
Fig. 6 is a view of one of the apertured flow control elements.

The embodiment as shown in Fig. 1 comprises an upper container 2 and a lower container 4, the connection between the containers being hermetically sealed by a resilient gasket 8.

A filter and variable flow control device 10 is adapted to be placed in a position to form an interconnecting passage between the two containers. This device comprises an upper larger tubular section 11 and a lower smaller tubular section 16 connected by a lateral portion 18. The under side of the lateral portion 18 forms a bearing surface 14 adapted to rest upon the bottom portion 3 of the upper container 2, to form a closure for the lower container 4. The upper side of this lateral portion 18 forms a seat 22 which loosely supports one or more flow control elements 24 located in the upper tubular section 11 of the device. The side walls of this upper tubular section 11 have a series of openings 12 for establishing communication between the upper and lower containers through the interiors of the upper and lower tubular sections. The flow control elements 24 are made with a cross section smaller than the cross section of the bore of the upper tubular section 11 of the filter and each element 24 has an aperture 23 therethrough of approximately the same diameter as the passage 20 through the lower tubular section 16 of the filter.

There is preferably provided at least one non-apertured element 26 placed at the top and forming with the apertured elements 24 a tubular elongation of passage 20 through the lower tubular section 16 projecting upwardly into the upper tubular section 11, the elements being maintained in alinement with the passage 20 by the side walls of the upper tubular section 11. The contacting surfaces of the elements are made irregular to form a plurality of small orifices to enable liquid to flow therebetween to and from the passages through the upper and lower tubular sections. The upper tubular section 11 is further provided with a screw thread 28 to receive the mating end of the handle piece 30 which serves as a closure for the top of the tubular section 11 and also enables the filter to be readily inserted or removed from position. The handle piece may also serve as the end closure in place of element 26, but for reasons hereinafter explained it is preferable to have a clearance above the flow control elements to allow for a limited vertical movement thereof. Filter 10 may be removably held in position in any suitable manner. In the embodiment shown this is accomplished by forming projecting lugs 5 in container 2 which cooperate with the angular slots 32 in the side walls of the upper tubular section 11, acting as a bayonet joint to hold same in position and permit ready insertion or removal of the filter from the holder.

In operation the liquid is placed into the lower container 4 and the ground coffee bean in the upper container 2. Upon the application of heat to the lower container a pressure will begin to build in the space A above the water line and upon becoming sufficiently great it will force the water upwardly through passage 20 in the lower tubular section 16 into the upper container. A clearance 38 is allowed above the top flow control element which permits the elements to separate upon pressure being applied by the rising liquid, thereby enlarging the orifices and permitting a very rapid flow of liquid into the upper container, the emptying of the lower container until the water falls below the end of the section 16 thus being accomplished without substantial change in the temperature of the liquid.

In order to prevent the water from being forced upwardly through the lower tubular section 16 before a predetermined temperature has been reached a very small lost motion is provided for between the lugs 5 and the traverse portions of the slots 32 whereby the tubular member may be raised slightly, thus moving the under side bearing surface 14 of the lateral portion 18 slightly away from its seat on the bottom portion 3 of the upper container 2. This will produce a very restricted passage, thus permitting the pressure in the lower container to be temporarily released. As the pressure continues to build up it will overcome the balancing effect of the opening and then force the water upwardly through the lower tubular section 16. An opening having approximately the same size as an orifice having $\frac{1}{32}$ inch diameter has been found sufficiently large to prevent the flow of water in a coffee maker having a 50 ounce capacity until the temperature thereof has risen to approximately 195°, the desired lower limit at which coffee should be brewed.

As the lower container cools, a vacuum will be produced whereupon if surface 14 has been lifted it will reseat and the liquid will be drawn from the upper container to the lower one through the minute crevices between the flow control elements 24. The rate of flow will be dependent upon the number of apertured control elements 24 in the upper tubular section 11 and due to the minutely small openings between each element the passage of coffee grounds is made impossible. Upon completion of the downward flow the upper container is removed permitting the coffee to be served from the lower one. The filter may be removed and readily cleaned by passing a stream of water therethrough.

The embodiment of Fig. 4 differs from that of Fig. 1 in that the upper container 2 is provided with a tubular extension 2a as in the coffee makers now in common use. As the pressure in the lower container does not act directly on the filter the holding means may be dispensed with, the lower tubular section 16 being sufficient to keep the filter positioned, it being understood that the lower tubular section 16 could be dispensed with and holding means provided. In this embodiment to prevent the water from being forced upwardly before a predetermined temperature has been reached, an orifice 33 is provided in the tubular extension 2a which if no other escape is provided will enable the pressure to lift the bearing surface 14 from its seat to release same. In the embodiment illustrated, an orifice 34 is also provided in the lower tubular section 16, which will enable the pressure to be released therethrough without lifting the bearing surface 14 from its seat. The exact location of the orifice and its size will vary somewhat but with a coffee maker holding approximately 50 ounces of water a $\frac{1}{32}$ inch orifice about ¾ inch above the water line will prevent the water from rising until the desired temperature is obtained. As the pressure increases it will overcome the balancing effect of the orifice whereupon the water will be forced upward through lower tubular section 16 into the upper container 2, as in the prior embodiment. If the pressure is sufficiently great some water may be forced upwardly through tubular extension 2a when holding means are not provided but upon the creation of a vacuum in the lower container, the bearing surface 14 will seat and prevent any return flow through tubular extension 2a.

The size of the flow control orifice between the containers may readily be varied by varying the number of flow control elements in sections 11, this being done by removing the handle piece 30 whereupon the elements may be removed and one or more apertured elements removed and replaced by closure elements to decrease the combined orifice size or vice versa. As it may be desirable to make the filter in one piece the elements may be readily interchanged by standing them on edge and drawing them through openings 12, which are slightly wider than the elements. It is likewise possible to control the size of orifice by varying the irregularity of the contacting surfaces or the size of the apertures 23. Likewise by varying the clearance 38 the vertical opening may be varied. Thus the same type filter may be used regardless of the size of the coffee maker it only being necessary to vary the number of flow control elements to obtain the required rate of flow from one container to the other.

Preferably, a plurality of flow control elements are used, for in this manner the filter extends well up into the liquid in the upper container and due to the arrangement of orifices the flow of water into the upper container will be in substantially horizontal streams carrying the coffee away from the filter, whereupon the very fine sediment will tend to drop to the bottom of the mass. The openings 12 preferably terminate short of the bottom of the upper tubular section 11 thus forming a circumferential shoulder 40 which prevents the fine sediment from being carried to the orifices, thus eliminating the possibility of clogging the filter. As the liquid is forced downward it will not successively pass from the coffee grounds at the top of the mass to those at the bottom as has heretofore occurred but there will be a horizontal flow toward the filter whereby the water passing through one stratum of coffee will not pass through another, thus eliminating the passage of the entire contents through the finely divided sediment which settles to the bottom of the mass and assuring a brew free of suspended matter.

It is to be understood that the use of the orifice in tubular extension 2a of Fig. 3 for releasing the pressure may be done on coffee makers other than those wherein the present filter is used and applicant does not limit himself to its use in combination with the present filter. An orifice may likewise be used in lower tubular section 16 of Fig. 1 and bearing surface 14 securely held in bottom position. Preferably, the parts are made of glass or some other nonmetallic substance with which the coffee will not react.

The filter per se, shown and described but not claimed herein forms the subject matter of my copending application filed November 1, 1933, Serial No. 696,954, of which application this is a division.

What I claim is:

1. In a coffee maker, upper and lower separable containers, and a filter removable therefrom and comprising a vitreous tubular member having upper and lower sections, the lower section having a restricted passage extending downwardly into the lower container and a gravity operated vitreous element loosely disposed within the upper section of the tubular member and normally almost closing said restricted passage, said upper container having a depending tube surrounding the lower section of the tubular member, the said lower section of the tubular member having a side wall orifice above the water line within the lower container.

2. In a coffee maker, upper and lower separable containers, and a filter removable therefrom and comprising a vitreous tubular member having upper and lower sections, the lower section having a restricted passage extending downwardly into the lower container and a gravity operated vitreous element loosely disposed within the upper section of the tubular member and normally almost closing said restricted passage, said upper container having a depending tube surrounding the lower section of the tubular member and terminating below the water line in the lower container, the lower section of the tubular member and the depending tube of the upper container both having side wall orifices above the water line within said lower container.

CLYDE D. KEATON.